Patented Feb. 18, 1930

1,747,579

UNITED STATES PATENT OFFICE

CHARLES B. DURGIN, OF ANNISTON, ALABAMA, AND PAUL LOGUE, OF ST. LOUIS, MISSOURI, ASSIGNORS TO FEDERAL PHOSPHORUS COMPANY, OF BIRMINGHAM, ALABAMA, A CORPORATION OF ALABAMA

MATERIAL COMPRISING CALCIUM SULPHATE ANHYDROUS AND CALCIUM PHOSPHATE PYRO AND METHOD FOR MANUFACTURING SAME

No Drawing.   Application filed November 16, 1925.  Serial No. 69,489.

This invention relates to a method of manufacture of a new material comprising calcium sulphate anhydrous and calcium phosphate pyro, and the product of the method of manufacture.

The object of this invention is to produce a material that is most satisfactory for certain cleaning and polishing purposes requiring a low abrasive characteristic and high absorptive property.

Heretofore such material has been produced by the mechanical mixing of the component materials prepared separately. By our process we propose to produce the requisite component materials so as to avoid mechanical mixing and since the materials are more or less bonded as produced, the likelihood of segregation is avoided.

A further object of this invention is the utilization of materials in a manner not heretofore proposed whereby economic advantages are obtained by the operation of this process.

More specifically this process comprises the production of calcium sulphate anhydrous and pyro calcium phosphate by treating calcined steamed bone with sulphuric acid to form calcium sulphate and phosphoric acid. The phosphoric acid thus formed is neutralized with a milk of lime and di-calcium phosphate is formed. The solid calcium sulphate and di-calcium phosphate is filtered from the solution in which they are formed, dried and calcined, when calcium sulphate anhydrous and pyro calcium phosphate are formed. It is also possible to employ a mixture of sulphuric acid and phosphoric acid of the desired proportions and neutralize this mixture with milk of lime, whereby a calcium sulphate, di-calcium phosphate precipitate is formed. The product resulting from these neutralizations is different in appearance and physical characteristics from a mixture of calcium sulphate and pyro calcium phosphate which are precipitated separately and subsequently mixed. This difference takes the form of an intertwining or bonding of the crystals of calcium sulphate with the crystals of di-calcium phosphate. This natural intertwining or bonding accomplishes a much more satisfactory and thorough mixing of the two ingredients than is possible by merely mechanically mixing the two compounds which were produced separately. Further, the hardness, the abrasive properties, and the absorptive characteristics of the natural bonded mixture produced simultaneously is different from that when they are precipitated separately and subsequently mechanically mixed. Moreover, because the crystals are bonded together, this new material will not be subject to the disadvantages that may result from the segregation of loose, mechanically mixed crystals.

That others may understand our process more thoroughly, and practice it, we will now describe the procedure and the product formed. Using calcined steamed bone as a source of phosphoric acid and part of the lime, we first screen ordinary commercial steamed bone to remove such foreign materials as may be present. After the bone is screened, we crush it in any type of suitable disintegrator and reduce it to approximately half inch size particles. This crushed steamed bone is then fed into any type of calciner suitably constructed to heat the material to approximately 800° C. Preferably, we employ a rotary calciner, which is heated by means of oil or gas fuel. In heating the steamed bone in this manner, we decompose any organic matter which is present, and have a resultant material of white appearance which is substantially free from organic impurities. After such material is discharged from the calciner, it is allowed to cool and passed over a magnetic separator to remove any tramp iron which may have gotten in during the calcining process, or prior to that. The material is then passed through a crusher of any suitable type which will reduce the one half inch material to approximately 65 mesh. The discharge from the crusher is passed over a screen which returns any oversize particles to the crusher and permits the suitably sized material to pass on to a hopper which is used for storage. From the hopper, the ground bone is fed into a mixing tank to which has been added a dilute solution of hot sulphuric acid of approximately 1.06 to 1.07 specific gravity. Sufficient bone is added to the sulphuric acid tank so that the lime present in the bone will react with the sulphuric acid and form calcium sulphate. This mixture is then stirred for several hours, or until the reaction is completed. The resultant mixture is composed of calcium sulphate suspended in a hot dilute phosphoric acid solution. After the reaction is completed between the ground bone and the sulphuric acid, sufficient milk of lime is added to precipitate the desired proportion of the phosphoric acid contained in the mixture. This produces a mixture of calcium sulphate and di-calcium phosphate which is then filtered in any suitable manner and washed with water to remove the final traces of soluble calcium phosphate or phosphoric acid which may be present. Ordinarily, the solution containing the precipitates will contain from four to eight per cent water soluble phosphoric acid ($P_2O_5$). The filtered washed material is then charged into a suitable calcining furnace which may be heated by means of oil or gaseous fuel, where the temperature is raised to about 1400° F. In this furnace the water of crystallization is completely driven off from the calcium sulphate and the di-calcium phosphate is converted into pyro calcium phosphate. The discharge from the furnace is then cooled and passed through a pulverizer where it is ground and then passed to a screen, which is equipped to properly grade the material according to the sizing desired. A return is provided for the oversize particles which go to the mill for regrinding.

It is obvious that varying percentages of pyro calcium phosphate may be produced depending upon the extent to which the mixture of calcium sulphate and phosphoric acid is treated with milk of lime solution. That is to say, if the milk of lime solution is added until all of the soluble phosphoric acid ($P_2O_5$) is precipitated, there will be a larger percentage of phosphoric acid ($P_2O_5$) in the product than if the neutralization is not carried so far. Preferably, for the purposes desired of the materials produced, we neutralize the acid solution until the product will contain approximately 15% phosphoric acid ($P_2O_5$) in the form of pyro calcium phosphate. By stopping at this point we produce a new material which will contain no alkaline particles from the milk of lime, and which will have all of the desired abrasive and absorptive properties. The following is a chemical analysis of such a material:—

| | Per cent |
|---|---|
| CaO | 42.5 |
| $SO_3$ | 44.0 |
| $P_2O_5$ | 13.5 |
| (FeAl)$PO_4$ | 0.7 |

Should a mixture of sulphuric acid and phosphoric acid be employed instead of starting with calcined steamed bone and sulphuric acid, the milk of lime solution may be added to a mixture of sulphuric and phosphoric acid until the product contains the same percentage of phosphoric acid ($P_2O_5$) as in the cases where steamed bone and sulphuric acid is used. This procedure is identical with that previously described where steamed bone and sulphuric acid are used.

The bonded material produced by our process, while not differing in analysis from the mechanically mixed material, will, nevertheless differ in important respects, from the latter material i. e., it will have a lower abrasive characteristic because its particles will break down easier, and it will have a greater absorptive property.

Having thus described our invention, what we claim as new and desire to secure by Letters Patent, is:—

1. The hereindescribed method of manufacturing of abrasives consisting essentially of calcium sulphate and pyro calcium phosphate, which comprises mixing sulphuric acid with a phosphate, precipitating the calcium sulphate and di-calcium phosphate, filtering, washing and calcining the resultant bonded material.

2. The hereindescribed method of manufacturing of abrasives, a mixture consisting essentially of calcium sulphate and pyro calcium phosphate from a phosphate-sulphuric acid mixture, comprising the simultaneous precipitation of intertwining crystals of calcium sulphate and di-calcium phosphate, subjecting said crystals to heat, dehydrating said calcium sulphate, and converting said calcium phosphate to pyro calcium phosphate.

3. The hereindescribed method for the manufacture of abrasives, a mixture consisting essentially of calcium sulphate anhydrous and pyro calcium phosphate mixtures having new abrasive characteristics, comprising the treatment of calcined steamed bone with hot dilute sulphuric acid, then digesting, then neutralizing the phosphoric acid with milk of lime, then filtering and washing the precipitate, then drying, calcining, grinding, and grading the mixture, substantially as described.

4. The hereindescribed method for the manufacture of abrasives, a mixture consisting essentially of calcium sulphate anhydrous, pyro calcium phosphate, mixtures comprising the treatment of calcined steam bone with hot dilute sulphuric acid, then digesting, then neutralizing the phosphoric acid with milk of lime to the stage where the product will contain approximately 15% $P_2O_5$, then filtering and washing the precipitate, then drying, calcining, grinding and grading, substantially as described.

5. The hereindescribed method for the manufacture of abrasives, a mixture consisting essentially of calcium sulphate anhydrous and pyro calcium phosphate mixtures, comprising the treatment of calcined steam bone with hot sulphuric acid of approximately 1.075 specific gravity, then digesting, then neutralizing the phosphoric acid with milk of lime to the stage where the product will contain approximately 15% $P_2O_5$, then filtering and washing the precipitate, then drying, calcining, grinding and grading, substantially as described.

In testimony whereof we affix our signatures.

CHARLES B. DURGIN.
PAUL LOGUE.